(12) United States Patent
Schachinger et al.

(10) Patent No.: US 12,092,493 B2
(45) Date of Patent: Sep. 17, 2024

(54) ARRANGEMENT AND METHOD FOR POSITION DETECTION WITH ERROR DETECTION WITH A POSITION ENCODER

(71) Applicant: B&R INDUSTRIAL AUTOMATION GMBH, Eggelsberg (AT)

(72) Inventors: Patrick Schachinger, Eggelsberg (AT); Christian Schneider, Eggelsberg (AT); Klaus Doppelhammer, Eggelsberg (AT); Roland Reichhartinger, Eggelsberg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 156 days.

(21) Appl. No.: 17/993,157

(22) Filed: Nov. 23, 2022

(65) Prior Publication Data

US 2023/0160724 A1    May 25, 2023

(30) Foreign Application Priority Data

Nov. 24, 2021    (AT) .............. A 50939/2021

(51) Int. Cl.
*G01R 5/20*    (2006.01)
*G01B 7/30*    (2006.01)
*G01D 5/20*    (2006.01)

(52) U.S. Cl.
CPC ...... *G01D 5/20* (2013.01); *G01B 7/30* (2013.01)

(58) Field of Classification Search
CPC ............ B60W 2420/506; G06K 7/082; H05K 2201/086; Y10S 336/00; Y10S 505/87
See application file for complete search history.

(56) References Cited

U.S. PATENT DOCUMENTS

| | | | |
|---|---|---|---|
| 8,339,126 B2 | 12/2012 | Izak et al. | |
| 9,188,421 B2 | 11/2015 | Prüssmeier et al. | |
| 2009/0179605 A1 | 7/2009 | Kanekawa et al. | |
| 2014/0232379 A1* | 8/2014 | Nazarian | G01D 5/147 324/207.21 |
| 2017/0205458 A1 | 7/2017 | Karooka et al. | |
| 2017/0227379 A1* | 8/2017 | Oshinubi | G01D 5/2013 |
| 2018/0111485 A1 | 4/2018 | Lechner et al. | |

(Continued)

FOREIGN PATENT DOCUMENTS

| | | |
|---|---|---|
| DE | 10 2004 002 629 | 8/2005 |
| DE | 10 2015 211232 | 12/2016 |
| DE | 10 2020 209 601 | 2/2022 |

(Continued)

OTHER PUBLICATIONS

Europe Search Report conducted in counterpart Europe Appln. No. EP 22208699.3 (Mar. 14, 2023).

(Continued)

*Primary Examiner* — Tung X Nguyen
(74) *Attorney, Agent, or Firm* — GREENBLUM & BERNSTEIN, P.L.C.

(57) ABSTRACT

In order to enable safe position determination for a position encoder over the entire range of movement, a defined electrical interference signal is applied to at least one secondary winding of the position encoder, and this generates an electrical response signal, which is superimposed on the measurement signal, and the response signal is evaluated for error detection in a signal evaluator.

15 Claims, 3 Drawing Sheets

(56) References Cited

U.S. PATENT DOCUMENTS

2020/0103250 A1\* 4/2020 Yashan .................... G01D 3/08

FOREIGN PATENT DOCUMENTS

| EP | 2 078 933   | 7/2009  |
|----|-------------|---------|
| EP | 2 105 713   | 9/2009  |
| JP | 11-337373   | 12/1999 |
| WO | 2012/110153 | 8/2012  |

OTHER PUBLICATIONS

Austria Search Report conducted in counterpart Austria Appln. No. A 50939/2021 (Oct. 12, 2022).

\* cited by examiner

ARRANGEMENT AND METHOD FOR POSITION DETECTION WITH ERROR DETECTION WITH A POSITION ENCODER

CROSS-REFERENCE TO RELATED APPLICATION

This application claims priority under 35 U.S.C. § 119(a) to Austria Application No. A50939/2021 filed Nov. 24, 2021, the disclosure of which is expressly incorporated by reference herein in its entirety.

BACKGROUND

1. Field of the Invention

The embodiments relate to a method for detecting errors when operating a position encoder comprising at least two secondary windings, into each of which a relevant electrical measurement signal is induced by an excitation unit during operation of the position encoder, and the measurement signals are each transmitted via a relevant signal line to an evaluation unit and are evaluated in the evaluation unit. Embodiments also relate to a corresponding arrangement for position detection with a position encoder and with error detection.

2. Discussion of Background Information

A resolver is a rotary position encoder, which operates inductively and is robust and inexpensive, which is why a resolver is used in many ways. A resolver enables the detection of the angular position of a rotor of the resolver. If the rotor of the resolver is connected to a rotating component, such as a rotating shaft of a machine, it will then be possible to detect the angular position or angular velocity of the component. An example of a typical application of a resolver in the case of an electric motor is in order to obtain positional information about the motor shaft. The combination of electric motor and resolver is often also referred to as a servomotor. The positional information can then be used for control, for example position control or speed control, of a servo-drive consisting of the servomotor and a load driven thereby. However, translational position encoders are also known which serve for position detection between a translational component and a stationary component. A rotary position encoder, considered within the context of the present invention, and a translational position encoder operate according to the same, well-known measuring principle.

In a position encoder there are a magnetic excitation unit, for example a permanent magnet or an excitation winding, which is moved along together with a moving component, and at least two secondary windings in a fixed position relative to the excitation unit. The excitation unit generates an (electro)magnetic field which induces, in the secondary windings, voltages which serve as measurement signals. These voltages are output by the position encoder as measurement signals and are evaluated in a downstream evaluation unit in order to determine the positional information therefrom. The secondary windings are usually arranged so that the measured voltages are phase-shifted by 90°, for which reason the measurement signals are often also referred to as sine and cosine tracks. However, other angles are of course also possible. The amplitudes of the measured voltages thus run as a sine function depending on the position of the excitation unit in relation to the secondary winding, or as a cosine function in the case of the secondary winding arranged offset by 90°, or generally as a sine function with a specific phase offset. The evaluation of the two measurement signals, for example by means of the arctangent function, makes possible an unambiguous calculation of the current position.

In the case of a position encoder, an error detection is often also implemented which typically focuses on the pointer length Z of the measurement signals, as is explained in FIG. 3 on the basis of a rotary position encoder. The pointer length Z of the measurement signals is the vectorial addition of the current value of the sine and cosine measurement signals and can, for example, be given as the sum of the squares of the amplitudes of the measurement signals, also as the square root of this sum. Such a pointer consequently rotates with the relative position of the moving part of the position encoder in relation to the stationary part of the position encoder, for example with the revolution of the rotor. For error detection, a check is made as to whether the pointer falls within a predefined pointer tolerance band ZT (FIG. 3). The fundamental known problem here is that the measurement signals as sine and cosine functions have zero crossings. There are four zero crossings in one period of the measurement signals. In the region of the zero crossings, however, no error detection is therefore possible because the signal levels of a measurement signal are too low to be able to reliably infer a pointer length Z and an error. With the typical resolutions of evaluation electronics for the measurement signals, there are typical blind angle ranges TB of the pointers around each zero crossing of a measurement signal, which can be in the range of $\alpha=30°$ to $40°$, as shown in FIG. 3. With this conventional procedure error detection is thus severely limited. Although these blind angle ranges TB can be reduced (for example $\alpha=20°$) due to the tolerances and resolutions of the evaluation electronics that are customary when correspondingly more accurate components are used, these blind angle ranges TB cannot be eliminated entirely.

Due to these blind angle ranges TB, a position encoder cannot be used for a safe application (in the sense of functional safety, for example a safety requirement level according to the standard IEC 61508). Safe position determination would thus be restricted to the regions between the blind angle ranges TB, but this would not be sufficient for most applications.

SUMMARY

Embodiments provide a method by which safe position determination is possible for a position encoder over the entire range of movement.

According to embodiments, the response signal can be detected unambiguously and reliably in any position of the position encoder, whereby the blind regions as in the case of the previously customary pointer evaluation are omitted. This enables error detection and safe position determination over the entire range of movement of the position encoder. This type of error detection can therefore also be used in particular for functionally safe position determination with a position encoder. For this purpose, the position encoder itself does not have to be changed, which means that standard components can be used. Only an additional circuit is required, which generates the interference signal and applies it to the secondary winding in order to generate the response signal. Since the evaluation of the measurement signal in the evaluation unit is usually implemented as software anyway, only the software in the evaluation unit needs to be supplemented by the function of error detection, which is likewise simple to realize. It may be that only simple hardware components, such as filters, must be additionally implemented in the evaluation unit, unless these functions are also executed in software.

In an advantageous design that is easy to implement, the interference signal is applied to the secondary winding via a voltage divider. In this case, it is advantageous if the voltage divider is formed by a series connection of at least one injection impedance with an electrical energy source (voltage source or current source) and being connected in parallel to the winding impedance of the at least one secondary winding. This connection enables the simple but reliable and accurate generation and application of the interference signal to the secondary winding.

In an advantageous embodiment an error is detected if the response signal changes. For this purpose, in order to detect a change the response signal is detected at least at two different points in time, preferably constantly (continuously or at prespecified time intervals).

If a direct current signal is used as the interference signal and the response signal is detected as a DC offset of the measurement signal, it will be possible to reliably detect an error if the DC offset changes.

If an alternating current signal is used as the interference signal and a winding impedance of the secondary winding is determined from the response signal, it will be possible to reliably detect an error if the winding impedance changes. For this purpose, in order to detect a change the winding impedance is determined at least at two different points in time, preferably constantly (continuously or at prespecified time intervals).

An electrical interference signal is particularly advantageously applied to at least two secondary windings, so that the electrical interference signal at the associated secondary winding in each case generates a response signal on the associated signal line. Error detection can then take place by comparing the at least two response signals, an error being detected if the result of the comparison of the at least two response signals changes. A difference or a quotient of the at least two response signals is preferably used as the comparison. For this purpose, in order to detect a change, the comparison is captured at least at two different points in time, preferably constantly (continuously or at prespecified time intervals). The comparative evaluation has the advantage that external influences act on both secondary windings and signal lines, such as, for example, temperature influences, aging effects and the like, whereby both response signals are influenced approximately identically by such external influences and are compensated by the comparison.

Embodiments are directed to a method for detecting errors when operating a position encoder that comprises at least two secondary windings. The method includes inducing an electrical measurement signal into each of the at least two secondary windings by an excitation element during operation of the position encoder, and transmitting each of the measurement signals via a signal line to a signal evaluator and evaluating each of the transmitted measurement signals in the signal evaluator. A defined electrical interference signal is applied to at least one secondary winding, which generates an electrical response signal that is superimposed on the measurement signal, and the response signal is evaluated for error detection in the signal evaluator.

According to embodiments, the interference signal can be applied to the secondary winding via a voltage divider. Further, the voltage divider may be formed by a series connection of at least one injection impedance with an electrical energy source being connected in parallel to the winding impedance of the at least one secondary winding.

In embodiments, an error can be detected if the response signal changes.

In other embodiments, a direct current signal may be used as the interference signal and the response signal is detected as a DC offset of the measurement signal, and an error can be detected if the DC offset changes.

According to other embodiments, an alternating current signal may be used as the interference signal and, from the response signal, a winding impedance of the secondary winding is determined, and an error can be detected if the winding impedance changes.

In still other embodiments, an electrical interference signal can be applied to at least two secondary windings, so that the relevant electrical interference signal at the relevant secondary winding in each case generates, on the associated signal line, a response signal superimposed on the relevant measurement signal, and the at least two response signals may be compared with each other, and an error can be detected if the result of the comparison of the at least two response signals changes. Moreover, a difference or a quotient of the at least two response signals may be determined as the comparison, and an error can be detected if the difference or the quotient of the at least two response signals changes.

Embodiments are directed to an arrangement for position detection with error detection that includes a position encoder comprising at least two secondary windings and an excitation element and a signal evaluator comprising an error detector. Each secondary winding is connected to the signal evaluator via a signal line, and, during operation of the position encoder, the excitation element induces a relevant electrical measurement signal in each of the at least two secondary windings and the signal evaluator evaluates, for position determination, the measurement signals obtained via the signal lines. An electrical energy source is arranged to generate a defined electrical interference signal and apply the generated interference signal to at least one of the secondary windings, whereby an electrical response signal is superimposed on the measurement signal. The error detector is arranged to evaluate the response signal superimposed on the measurement signal for error detection.

According to embodiments, the electrical energy source may be arranged to apply the interference signal to the at least one secondary winding via a voltage divider. Further, a series connection of at least one injection impedance with the electrical energy source can be provided which, in order to form a voltage divider, may be connected in parallel to the winding impedance of the at least one secondary winding in order to apply the interference signal to the at least one secondary winding via a voltage divider. The error detector can be designed to detect an error if the response signal changes.

In accordance with still yet other embodiments, the electrical energy source can be arranged to generate a direct current signal as the interference signal and the response signal may be a DC offset of the measurement signal, and the error detector may be designed to detect an error if the DC offset changes. Still further, the electrical energy source can be arranged to generate an alternating current signal as the interference signal and the error detector can be designed to determine, from the response signal, a winding impedance of the secondary winding and to detect an error if the winding impedance changes. Moreover, arrangement can be configured to apply an electrical interference signal to the at least two secondary windings, so that the relevant electrical interference signal at the relevant secondary winding in each case generates, on the associated signal line, a response signal superimposed on the relevant measurement signal, and the error detector can be designed to compare the at least two response signals to each other and to detect an error if the result of the comparison of the at least two response signals changes.

Other exemplary embodiments and advantages of the present invention may be ascertained by reviewing the present disclosure and the accompanying drawing.

BRIEF DESCRIPTION OF THE DRAWINGS

In the following, the present invention is described in greater detail with reference to FIGS. 1 to 7, which, by way of example, show advantageous embodiments of the invention in a schematic and non-limiting manner. The drawings show.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
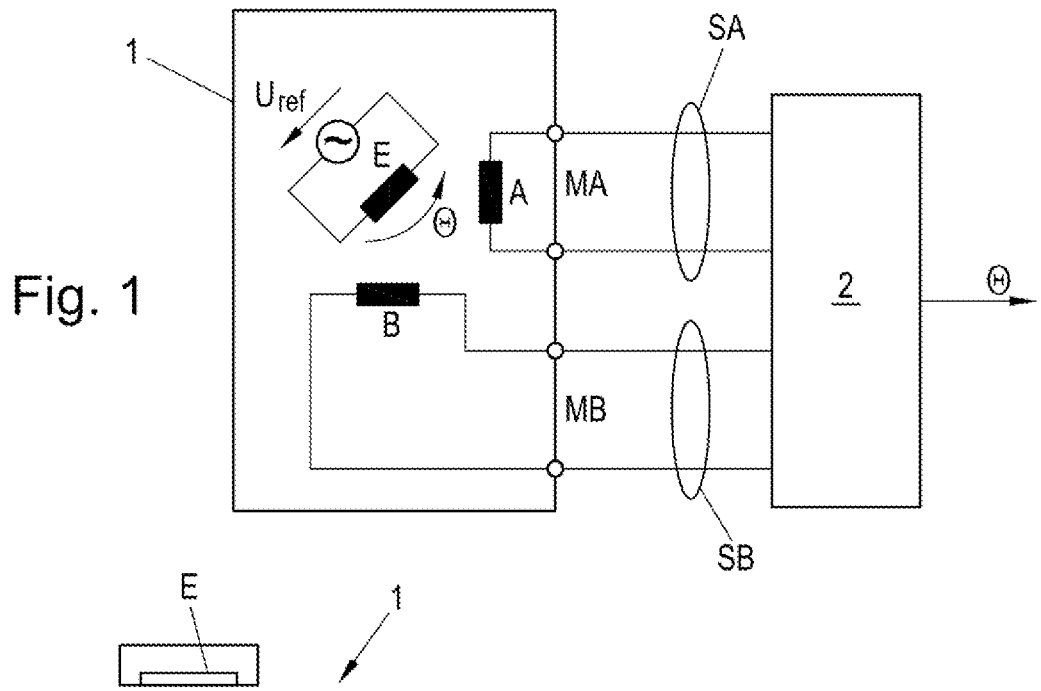
FIG. 1 a rotary position encoder.
Figure 2:
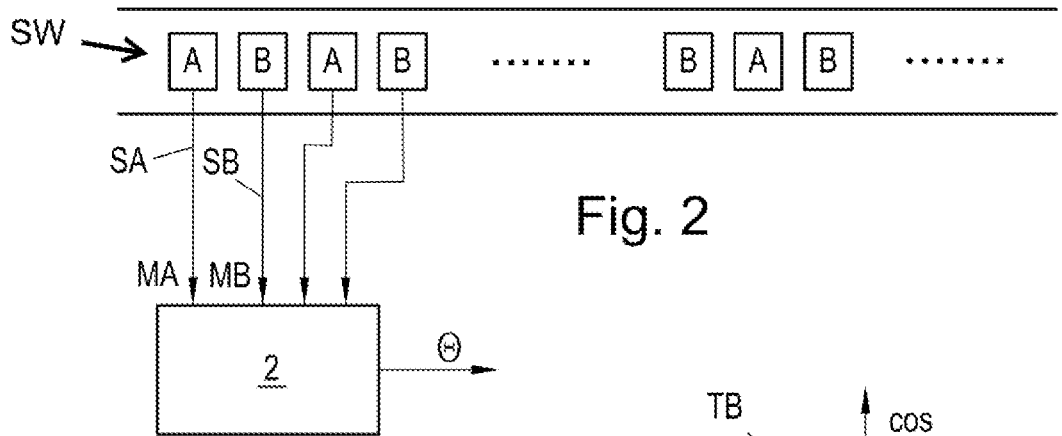
FIG. 2 a translational position encoder.
Figure 3:
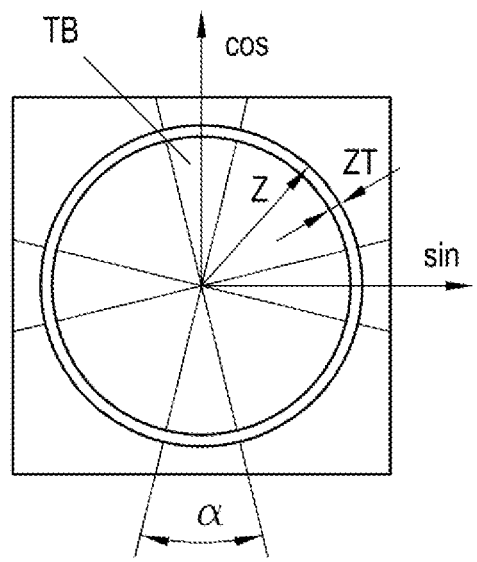
FIG. 3 the resulting blind regions in error detection according to the prior art.

A position encoder 1 for position determination is well known and is shown in an exemplary embodiment as a rotary position encoder (resolver) in FIG. 1. However, the position encoder 1 can also be designed as a translational position encoder, as indicated in FIG. 2. A position encoder is generally an electromagnetic measuring transducer for converting into an electrical quantity the position of a moving component in relation to a stationary component. For position determination, parts of the position encoder which interact are arranged not only on the moving component but also on the stationary component or connected to interacting parts of the position encoder.

The position encoder 1 in the embodiment according to FIG. 1 has as excitation unit (excitation element) E with an excitation winding, which is excited by an excitation signal $U_{ref}$. The excitation signal $U_{ref}$ is an electrical alternating signal with a specific excitation amplitude R0 and excitation angular frequency ω, i.e., $U_{Ref}=R0 \cdot \cos(\omega t)$, where t denotes the time. The excitation winding E is usually supplied with an alternating voltage as the excitation signal $U_{ref}$ with an excitation frequency typically, but not in a limiting manner in the frequency range of 1 kHz to 10 kHz. If the excitation unit E moves relative to a secondary winding A. B of the rotary position encoder 1, a voltage which is dependent on the angular position θ of the relevant secondary winding A, B with respect to the excitation unit E and which is output by the rotational position encoder 1 as measurement signals MA, MB is induced in the secondary winding A, B.

The two secondary windings A, B are arranged spatially offset relative to one another, usually rotated by 90° to one another, and the excitation unit E, which can be arranged on a rotating component, rotates within the rotary position encoder 1. The output measurement signals MA, MB are evaluated in an evaluation unit 2 in order to determine the angular position θ therefrom.

The voltages measured in the secondary windings A, B of the rotary position encoder 1 and induced due to the rotating magnetic field of the excitation unit E pulsate at the same frequency as the excitation signal $U_{ref}$. However, their amplitudes are dependent on the position of the excitation winding E in relation to the relevant secondary winding A, B and thus on the angular position θ of the rotor. The measurement signals MA, MB are an amplitude modulation of an electrical variable oscillating with the frequency of the excitation signal. The actual positional information thus lies in the envelope of the measurement signals MA, MB which is extracted from the output measurement signals. The envelope corresponds to the sine function (or cosine function) of the measured voltage, wherein the period duration corresponds to one revolution of the excitation unit E, and the period duration thus depends on the angular velocity of the excitation unit E.

In a simple embodiment of a rotary position encoder 1, however, a permanent magnet can also be used as the excitation unit E instead of the excitation winding. The measurement signals MA, MB are then not amplitude-modulated, but result directly as sine or cosine.

The rotary position encoder 1 is connected to the evaluation unit (signal evaluator) 2 by signal lines SA, SB, via each of which a relevant measurement signal MA, MB is transmitted to the evaluation unit 2. However, the evaluation unit 2 can also be integrated in the position encoder 1, wherein in this case the signal lines SA, SB would be provided in the rotary position encoder 1.

The excitation unit E is connected to a rotating component, for example to a motor shaft of an electric motor, and the secondary windings A, B are arranged on a stationary component, for example on a housing of the rotary position encoder 1, which in turn can be arranged on a motor housing of the electric motor. The excitation unit E thus co-rotates with the rotating component and rotates relative to the fixed secondary windings A, B.

With a rotary position encoder 1 and an excitation signal $U_{ref}=R0 \cdot \cos(\varphi)$, with excitation frequency $\varphi=\omega t$, as well as a 90° offset arrangement of the secondary windings A, B, the measurement signals MA, MB result, for example, as $$MA = R0 \cdot u \cdot \cos(\theta) \cdot \cos(\varphi - \Delta\varphi)$$

$$MB = R0 \cdot u \cdot \sin(\theta) \cdot \cos(\varphi - \Delta\varphi)$$

Here, u designates a known transfer ratio of the rotary position encoder 1 and Δφ designates a delay which results essentially from a runtime of the rotary position sensor 1 and the processing and evaluation of the measurement signals MA, MB in the evaluation unit 2 (e.g., by filters, computing units and the like). θ designates the angular position of the excitation winding E relative to the secondary windings A, B (indicated in FIG. 1) and thus the actual position of interest to be determined. The angular position θ can be determined in a known manner, for example, as an arctangent of the amplitudes of the measurement signals MA, MB.

This evaluation is carried out in the evaluation unit 2, for example by demodulation of the measurement signals MA, MB, whereby the frequency components of the excitation signal $U_{ref}$ are removed, or by suitable sampling of the measurement signals MA, MB.

The position encoder 1 can also be designed as a translational position encoder, as shown in FIG. 2. In the case of a translational position encoder 1, a plurality of secondary windings SW in the form of coils are arranged next to one another. An excitation magnet, for example a permanent magnet or an excitation winding EW (excitation coil), which generates an (electro-) magnetic excitation field, is used as the excitation unit E for the secondary windings SW. If the excitation unit E is moved past the secondary windings SW, a voltage will be induced therein, which is output as a measurement signal. The secondary windings SW are arranged such that measurement signals MA, MB again offset by 90° are generated in the form of a sine and cosine track. The measurement signals MA, MB are transmitted via signal lines SA, SB to an evaluation unit 2, in which the measurement signals MA, MB are evaluated to determine the position. The measurement signals MA, MB result, for example, as $$MA = u \cdot \cos(\theta)$$

$$MB = u \cdot \sin(\theta)$$

Here, u again designates a known transfer ratio of the translational position sensor 1. $\theta$ designates the relative position of the excitation unit E with respect to two secondary windings A, B arranged next to one another and thus the actual position of interest to be determined. $\theta$ stands for an angle in the range of 0 to 360°, which can be converted into a relative position between the excitation unit E and the secondary windings A, B. The position $\theta$ can be determined in a known manner, for example, as an arctangent of the amplitudes of the measurement signals MA, MB. This evaluation is carried out in the evaluation unit 2, for example by suitable sampling of the measurement signals MA, MB.

The excitation unit E of the translational position encoder is usually connected to a moving component, for example to a rotor of a linear motor, and the secondary windings A, B are arranged on a stationary component, for example on a stator of a linear motor. The excitation unit E then moves along together with the moving component and moves translationally relative to the fixed secondary windings A, B.

During operation of the position encoder 1, errors can occur, in particular a cable break in a signal line SA, SB, a short circuit between the signal lines SA, SB, a short circuit in a secondary winding A, B, or a change in a transfer ratio u in a measurement signal MA, MB. Such errors can understandably influence position determination and generally lead to it not being possible to determine position $\theta$ or to the determined position $\theta$ supplying incorrect values. It is therefore desirable to detect errors in position determination which are caused by a fault in the position encoder 1 itself or in a signal line SA, SB between the position encoder 1 and the evaluation unit 2. Such error detection is important in particular for safe position determination in the sense of functional safety.

For error detection, a defined electrical signal is injected into at least one measurement signal MA, MB output by the position encoder 1. To this end, an electrical interference signal SS is applied to the secondary winding A, B associated with the measurement signal MA, MB, and this generates, on the associated signal line SA, SB, an electrical response signal $RS_A$, $RS_B$ which is superimposed on the measurement signal MA, MB. The response signal $RS_A$, $RS_B$ is thus dependent on the winding impedance $XS_A$, $XS_B$ of the relevant secondary winding A, B. Since the response signal $RS_A$, $RS_B$ is superimposed on the associated measurement signal MA, MB, it also enters the evaluation unit 2, in which the response signal $RS_A$, $RS_B$ is evaluated for error detection. This principle is shown in FIG. 4.

The response signal $RS_A$, $RS_B$ can be separated from the measurement signal MA, MB in the evaluation unit 2, for example by suitable filters or demodulation, so that a separate evaluation of the actual useful signal for position determination and of the response signal $RS_A$, $RS_B$ is possible. To this end, the interference signal SS is suitably selected such that the actual useful signal of the position encoder 1, the measurement signal MA, MB, remains as uninfluenced as possible and the useful signal and the response signal $RS_A$, $RS_B$ can be easily separated in the evaluation unit 2. For this purpose, for example, the frequency of the interference signal and/or the interference signal amplitude must be selected appropriately.

Figure 4:
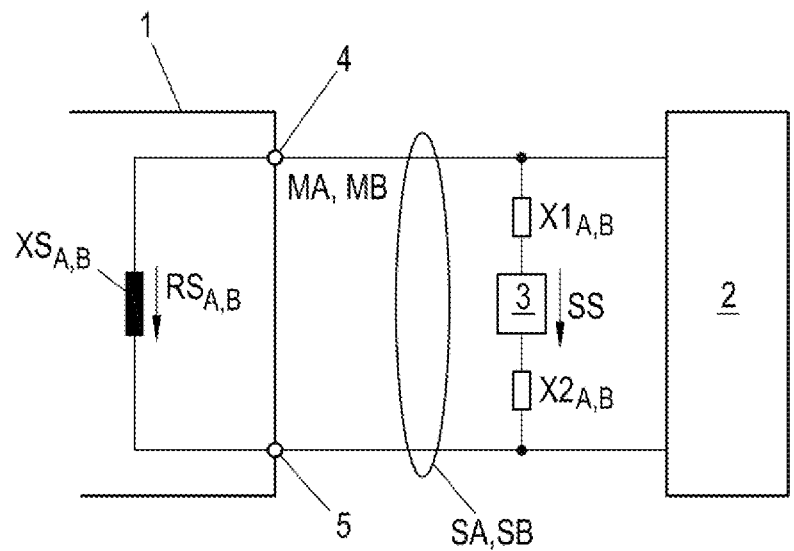
FIG. 4 an embodiment of error detection according to the invention.

In an advantageous embodiment, the interference signal SS is applied by means of a voltage divider to at least one secondary winding A, B, as shown in FIG. 4.

An electrical energy source 3, either a voltage source or current source, generates the defined electrical interference signal SS. A series connection comprising the electrical energy source 3 and at least one injection impedance $X1_A$, $X1_B$, $X2_A$, $X2_B$ is connected in parallel to the terminals 4, 5 of the secondary winding A, B. The energy source 3 and the at least one injection impedance $X1_A$, $X1_B$, $X2_A$, $X2_B$ can be integrated in the evaluation unit 2 or in the position encoder 1, or can also be separate therefrom. The signal line SA, SB, via which the measurement signal MA, MB is transmitted to the evaluation unit 2, is also connected to the terminals 4, 5 of the secondary winding A, B. An injection impedance $X1_A$, $X1_B$, $X2_A$, $X2_B$ is advantageously connected between each of the two terminals 4, 5 and the energy source 3 (as in the exemplary embodiment of FIG. 4), so that a series connection results from the energy source 3 and two injection impedances $X1_A$, $X2_A$, $X1_B$, $X2_B$.

As a result of the above-described circuitry of the secondary winding A, B, a voltage divider is formed between the at least one injection impedance $X1_A$, $X1_B$, $X2_A$, $X2_B$ and the winding impedance $XS_A$, $XS_B$ of the secondary winding A, B, into which the interference signal SS is fed. The winding impedance $XS_A$, $XS_B$ also contains the part of the signal lines SA, SB between injection of the interference signal SS and the secondary winding A, B. At the winding impedance $X_S$ of the secondary winding A, B, the voltage divider generates the response signal $RS_A$, $RS_B$ in the form of a voltage, which with a given interference signal SS and given injection impedance $X1_A$, $X1_B$, $X2_A$, $X2_B$ is dependent on the winding impedance $XS_A$, $XS_B$ of the secondary winding A, B. The response signal $RS_A$, $RS_B$ is thus dependent on the winding impedance $XS_A$, $XS_B$ of the secondary winding A, B. The response signal $RS_A$, $RS_B$ can thus be used for error detection.

In a defined initial state—given by a predetermined interference signal SS, known injection impedances $X1_A$, $X1_B$, $X2_A$, $X2_B$ and a present winding impedance $XS_A$, $XS_B$ of the secondary winding A, B—an initial response signal $RS_A$, $RS_B$ occurs. If the winding impedance $XS_A$, $XS_A$ of the secondary winding A, B changes due to an error in the position encoder 1, for example by a (partial) winding short in the secondary winding A, B, a cable break in the signal line SA, SB (between the injection of the interference signal SS and the secondary winding A, B), a short circuit between the signal lines SA, SB (between the injection of the interference signal SS and the secondary winding A, B) or a change in the transfer ratio, the response signal $RS_A$, $RS_B$ will also change. This change in the response signal $RS_A$, $RS_B$ (or a quantity derived therefrom) can be detected in the evaluation unit 2 or an error detection unit (error detector) 6, and thus conclusions can be drawn regarding an error in the position encoder 1. This detected error can be further processed in a suitable and required manner, for example signaled or forwarded to a higher-level control unit, for example a servocontrol unit of a servomotor. This error detection is thus independent of the measurement signal MA, MB.

Figure 5:
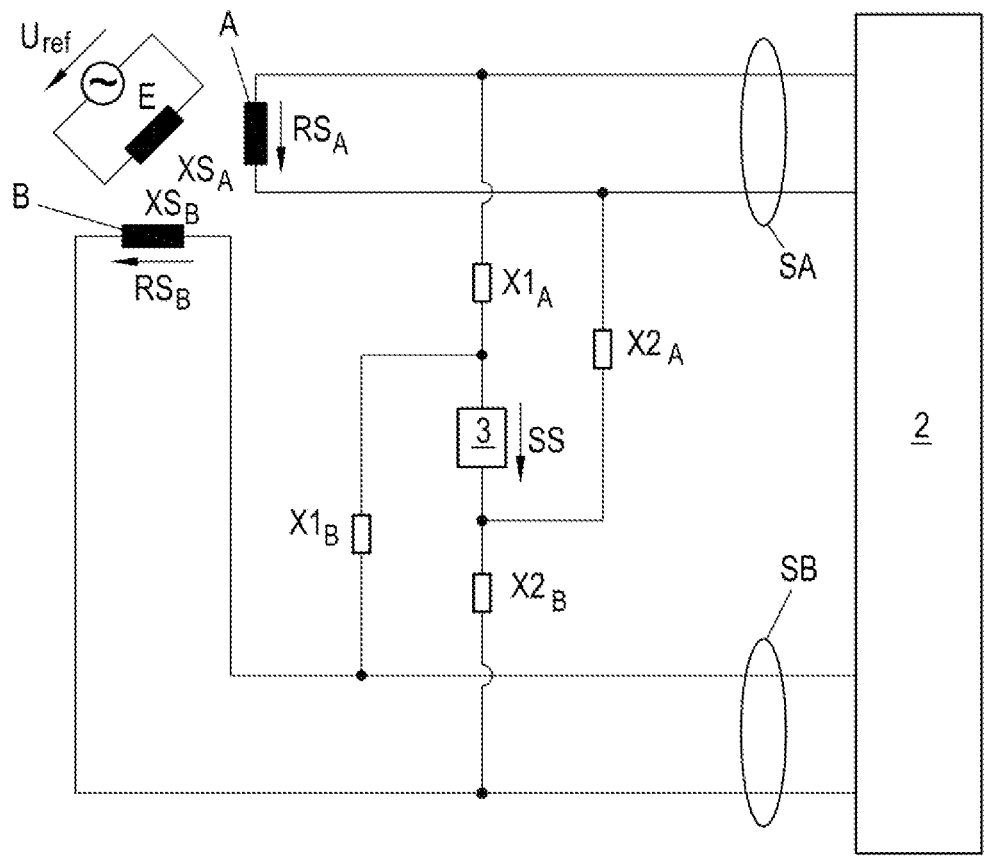
FIG. 5 a further embodiment of error detection according to the invention.

Although the interference signal SS can be applied only to one secondary winding A, B, it is advantageous if an interference signal SS is applied to a plurality of secondary windings A, B of the position encoder 1 that are to be monitored, preferably to all secondary windings (as shown in FIG. 5 using the example of a resolver), preferably by a voltage divider as described above. For this purpose, a common energy source 3 (voltage source or current source) can be used, or a separate energy source 3 can be used for each interference signal or plurality of interference signals. In the case of a voltage divider, a series connection of an energy source 3 and at least one injection impedance $X1_A$, $X2_A$, $X1_B$, $X2_B$ is connected in parallel to each monitored secondary winding A, B, A corresponding response signal $RS_A$, $RS_B$ is thus produced at the secondary windings A, B to which the interference signal SS is applied. However, it is not necessary for the interference signal SS to be the same for each secondary winding A. B.

The energy source 3 can also be adjustable in order to be able to adapt the interference signal SS to the position encoder 1. For this purpose, the energy source 3 can be designed as a controllable current source or controllable voltage source. For this purpose, a constant-current source or constant-voltage source with an adjustable resistor can also be used.

The interference signal SS can be a direct current signal (DC) or an alternating current signal (AC).

Figure 6:
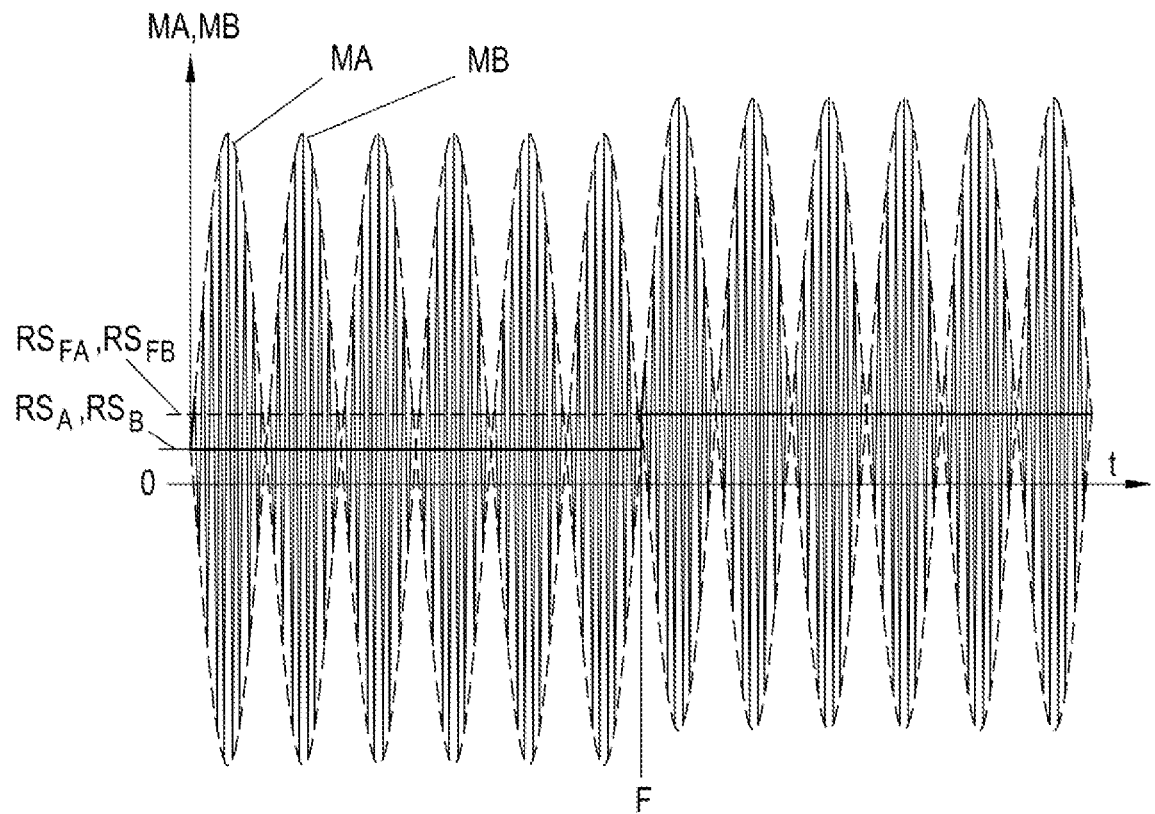
FIG. 6 a response signal with a DC offset for error detection.

In the case of a direct current signal as the interference signal SS, an ohmic resistor is advantageously used as the injection impedance $X1_A$, $X2_A$, $X1_B$, $X2_B$, and for the error evaluation preferably only the ohmic components of the relevant winding impedance $X_{SA}$, $X_{SB}$ are used. In this case, the response signal $RS_A$, $RS_B$ is a DC offset of the measurement signal MA, MB, as shown in FIG. 6. Without limiting generality, FIG. 6 shows an amplitude-modulated measurement signal MA, MB of a resolver as the position encoder 1. At time $t_F$ one of the above-mentioned errors F occurs, which results in a change of the response signal $RS_A$, $RS_B$ to an error response signal $RS_{FA}$, $RS_{FB}$, in this case a change in the DC offset. This change in the DC offset can be detected and evaluated in the evaluation unit 2.

Figure 7:
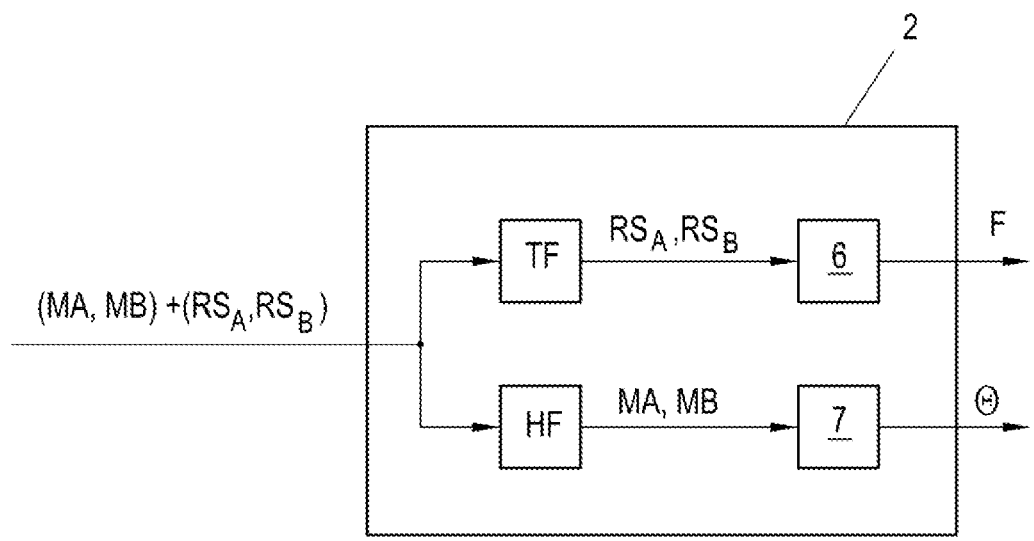
FIG. 7 an embodiment of an evaluation unit with error detection.

In a possible embodiment, the measurement signal MA, MB with the superimposed response signal $RS_A$, $RS_B$ is separated in the evaluation unit 2 by suitable filtering, as shown in FIG. 7. In a low-pass filter TF, the response signal $RS_A$, $RS_B$ is obtained and, in a high-pass filter HF, the measurement signal MA, MB is obtained. Of course, the cut-off frequencies of the filters must be selected accordingly. The response signal $RS_A$, $RS_B$ is fed to an error detection unit 6 and the measurement signal MA, MB is fed to a position determination unit 7. The position determination unit 7 determines the position θ in a known manner, for example as explained above. The error detection unit 6 can constantly check whether the current DC offset exceeds a prespecified limit value. If this is the case, an error F is inferred.

In the case of an alternating current signal as the interference signal SS, preferably a capacitor, or also a coil, is used as the injection impedance $X1_A$, $X2_A$, $X1_B$, $X2_B$, and these, with the relevant secondary winding A, B and its winding impedance $XS_A$, $XS_B$, form a complex voltage divider. The frequency of the interference signal SS is to be selected in a suitable manner, in particular such that the frequency does not conflict with the position determination. In the case of a resolver with an excitation winding as the position encoder 1, the frequency of the interference signal SS is chosen, for example, significantly higher than the excitation frequency of the resolver. In the case of a permanent magnet as the excitation unit E, for example, significantly higher than the expected highest useful frequency of the position encoder 1, which can be derived, for example, from the specified (for example, in the data sheet of the position encoder) maximum permissible rotational speed of the rotary position encoder 1 or the maximum permissible speed of the translational position encoder 1.

The separation of the useful signal of the position encoder 1 and the response signal $RS_A$, $RS_B$ in the evaluation unit 2 in the case of an alternating voltage signal as the interference signal SS is effected, for example, by demodulation of the measurement signal MA, MB and of the higher-frequency response signal $RS_A$, $RS_B$, which in turn results in a separation of the signals.

For example, the demodulation can take place with the known I&Q method (in-phase & quadrature method), wherein, of course, there is still a large number of other demodulation methods. A separation by filtering is also possible, of course. With the response signal $RS_A$, $RS_B$ the winding impedance $XS_A$, $XS_B$ can be determined, for example in the error detection unit 6. With the known injection impedance $X1_A$, $X1_B$, $X2_A$, $X2_B$ and the known interference signal SS, it is possible, for example, from the amplitude of the response signal $RS_A$, $RS_B$, to calculate back to the winding impedance $XS_A$, $XS_B$ by means of the complex voltage divider. Should the winding impedance $XS_A$, $XS_B$ change by a specific, prespecified value (also as a relative indication, for example in percent), it is possible to infer an error F, which can be checked in the error detection unit 6.

The error detection unit 6 and/or the position determination unit 7 can be designed not only as an analog circuit but also digitally. In the case of a digital embodiment, the measurement signal MA, MB with the superimposed response signal $RS_A$, $RS_R$ (in an embodiment also only after a separation) is suitably digitized, for example by an analog-to-digital converter, and evaluated in a microprocessor or an integrated circuit, such as a field programmable gate array (FPGA) or an application-specific integrated circuit (ASIC).

If an interference signal SS is applied to at least two secondary windings A, B, the resulting response signals $RS_A$, $RS_B$ can also be evaluated by comparison. The comparison can be carried out in the error detection unit 6. This can be applied both in the case of a direct current (DC) signal as the interference signal SS and in the case of an alternating current (AC) signal as the interference signal SS. For the comparison, the difference ($RS_A$−$RS_B$) or the quotient ($RS_A$/$RS_B$) of the response signals $RS_A$, $RS_B$ can be determined (in an analog or digital manner) in the evaluation unit 2, and the difference or the quotient can be used for error detection. In this case, however, it does not matter which response signal $RS_A$, $RS_B$ is the minuend and which the subtrahend; even the absolute value of the subtraction can be used. In the same way, it does not matter which response signal $RS_A$, $RS_B$ is the dividend and which the divisor.

For example, an error can be detected if the result of the comparison, e.g., a difference or a quotient of the response signals $RS_A$, $RS_B$, changes.

The comparative evaluation has the advantage that external influences, such as temperature influences, aging effects and the like, act on both secondary windings A, B and signal lines SA, SB, whereby the two response signals $RS_A$, $RS_B$ are influenced approximately equally by such external influences and are compensated for by the comparison, in particular the difference or quotient formation.

In the comparative evaluation, an error can be inferred if the difference resulting from the comparison exceeds a certain prespecified value.

If more than two secondary windings A, B are provided in the position encoder 1, and an interference signal is applied to all secondary windings A, B, the comparative evaluation for a group of secondary windings A, B can be performed crosswise. In this case, the comparison of each response signal $RS_A$, $RS_B$ with each other response signal $RS_A$, $RS_B$ in the group is carried out and evaluated.

The detection of a change in a certain variable, for example in a response signal $RS_A$, $RS_B$, or in a DC offset of a response signal $RS_A$, $RS_B$, or in a winding impedance $X_{SA}$, $X_{SB}$, or in a result of a comparison (e.g., difference, quotient) between two response signals $RS_A$, $RS_B$, is understood to mean, for example, that a check is made as to whether the relevant value of the variable changes by a specific prespecified amount, for example by ±10%, or whether a prespecified limit value for the specific variable is exceeded. In order to detect a change, the specific variable is determined at least twice, preferably constantly, which can either take place continuously or at prespecified time intervals.

In embodiments, the signal evaluation unit, the error detection unit and/or the position determination unit can be implemented digitally, e.g., as software on microprocessor-based hardware. Thus, these units can be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies, and/or analog instrumentation, e.g., analog electric/electronic circuits, analog computers, analog devices, etc. Further, the processing of the signals in these units can be implemented by microprocessors or similar components, programmed using software (e.g., microcode) to perform various functions discussed herein and may optionally be driven by firmware and/or software. Alternatively, these units may be implemented by dedicated hardware, or as a combination of dedicated hardware to perform some functions and a processor (e.g., one or more programmed microprocessors and associated circuitry) to perform other functions.

Moreover, the signal evaluation unit, error detection unit and/or position determination unit can also include at least one memory (not shown), e.g., a non-transitory computer readable medium or media, to store one or more sets of instructions to perform any of the methods or computer-based functions disclosed herein, evaluating the signals and determining errors, either alone or in combination with the other described devices. These units can also include at least one processor that can access the at least one memory to execute the one or more sets of instructions to perform any of the methods or computer-based functions discussed above. Moreover, the at least one memory can be part of the slave or can be remote from the slave, e.g., a remotely located server, memory, system, or communication network or in a cloud environment, and the at least one processor can also part of the slave or remote from the slave.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A method for detecting errors when operating a position encoder that comprises at least two secondary windings, comprising:
   inducing an electrical measurement signal into each of the at least two secondary windings by an excitation element during operation of the position encoder;
   transmitting each of the measurement signals via a signal line to a signal evaluator; and
   evaluating each of the transmitted measurement signals in the signal evaluator,
   wherein a defined electrical interference signal is applied to at least one secondary winding, which generates an electrical response signal that is superimposed on the measurement signal, and
   wherein the response signal is evaluated for error detection in the signal evaluator.

2. The method according to claim 1, wherein the interference signal is applied to the secondary winding via a voltage divider.

3. The method according to claim 2, wherein the voltage divider is formed by a series connection of at least one injection impedance with an electrical energy source being connected in parallel to the winding impedance of the at least one secondary winding.

4. The method according to claim 1, wherein an error is detected if the response signal changes.

5. The method according to claim 1, wherein a direct current signal is used as the interference signal and the response signal is detected as a DC offset of the measurement signal, and an error is detected if the DC offset changes.

6. The method according to claim 1, wherein an alternating current signal is used as the interference signal and, from the response signal, a winding impedance of the secondary winding is determined, and an error is detected if the winding impedance changes.

7. The method according to claim 1, wherein an electrical interference signal is applied to at least two secondary windings, so that the relevant electrical interference signal at the relevant secondary winding in each case generates, on the associated signal line, a response signal superimposed on the relevant measurement signal, and wherein the at least two response signals are compared with each other, and an error is detected if the result of the comparison of the at least two response signals changes.

8. The method according to claim 7, wherein a difference or a quotient of the at least two response signals is determined as the comparison, and an error is detected if the difference or the quotient of the at least two response signals changes.

9. An arrangement for position detection with error detection, comprising:
   a position encoder comprising at least two secondary windings and an excitation element;
   a signal evaluator comprising an error detector,
   wherein each secondary winding is connected to the signal evaluator via a signal line,
   wherein, during operation of the position encoder, the excitation element induces a relevant electrical measurement signal in each of the at least two secondary windings and the signal evaluator evaluates, for position determination, the measurement signals obtained via the signal lines,
   an electrical energy source arranged to generate a defined electrical interference signal and apply the generated interference signal to at least one of the secondary windings, whereby an electrical response signal is superimposed on the measurement signal,
   wherein the error detector is arranged to evaluate the response signal superimposed on the measurement signal for error detection.

10. The arrangement according to claim 9, wherein the electrical energy source is arranged to apply the interference signal to the at least one secondary winding via a voltage divider.

11. The arrangement according to claim 10, wherein a series connection of at least one injection impedance with the electrical energy source is provided which, in order to form a voltage divider, is connected in parallel to the winding impedance of the at least one secondary winding in order to apply the interference signal to the at least one secondary winding via a voltage divider.

12. The arrangement according to claim 9, wherein the error detector is designed to detect an error if the response signal changes.

13. The arrangement according to claim 9, wherein the electrical energy source is arranged to generate a direct current signal as the interference signal and the response signal is a DC offset of the measurement signal, and the error detector is designed to detect an error if the DC offset changes.

14. The arrangement according to claim 9, wherein the electrical energy source is arranged to generate an alternating current signal as the interference signal and the error detector is designed to determine, from the response signal, a winding impedance of the secondary winding and to detect an error if the winding impedance changes.

15. The arrangement according to claim 9 is configured to apply an electrical interference signal to the at least two secondary windings, so that the relevant electrical interference signal at the relevant secondary winding in each case generates, on the associated signal line, a response signal superimposed on the relevant measurement signal, and
   wherein the error detector is designed to compare the at least two response signals to each other and to detect an error if the result of the comparison of the at least two response signals changes.

* * * * *